(12) United States Patent
McCauley et al.

(10) Patent No.: US 8,151,774 B2
(45) Date of Patent: Apr. 10, 2012

(54) ENGINE COMBUSTION AIR CYCLONIC PRE-CLEANER EMBODYING THROTTLING MEMBER ADJUSTED IN ACCORDANCE WITH ENGINE LOAD

(75) Inventors: Courtney William McCauley, Mary Esther, FL (US); Alan David Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 468 days.

(21) Appl. No.: 12/464,999

(22) Filed: May 13, 2009

(65) Prior Publication Data
US 2010/0288230 A1  Nov. 18, 2010

(51) Int. Cl.
*F02B 33/00* (2006.01)
*F02D 23/00* (2006.01)

(52) U.S. Cl. .......................... 123/564; 60/600; 55/385.3

(58) Field of Classification Search .................. 123/350, 123/564, 198 E, 184.53, 566, 337; 55/385.3, 55/394, 393, 411, 412; 60/600
See application file for complete search history.

(56) References Cited

U.S. PATENT DOCUMENTS

| | | | | |
|---|---|---|---|---|
| 2,114,783 A * | 4/1938 | Kowitt | | 123/566 |
| 2,284,687 A * | 6/1942 | Schimanek | | 123/378 |
| 2,365,384 A * | 12/1944 | Bonnier | | 123/389 |
| 2,390,161 A * | 12/1945 | Mercier | | 60/248 |
| 3,336,017 A * | 8/1967 | Kopa | | 261/128 |
| 3,757,751 A * | 9/1973 | Kitchin et al. | | 123/566 |
| 3,917,568 A | 11/1975 | Klein et al. | | |
| 3,996,748 A | 12/1976 | Melchior | | |
| 4,028,076 A * | 6/1977 | Fields | | 55/394 |
| 4,080,184 A | 3/1978 | Petersen | | |
| 4,174,617 A | 11/1979 | Jalali-Karchay | | |
| 4,176,641 A | 12/1979 | Perr | | |
| 4,203,296 A * | 5/1980 | Tanaka et al. | | 60/602 |
| 4,218,223 A | 8/1980 | Lidstone et al. | | |
| 4,326,862 A * | 4/1982 | Suzuki | | 96/18 |
| 4,388,825 A | 6/1983 | deValpillieres | | |
| 4,489,595 A | 12/1984 | Klomp et al. | | |
| 4,805,573 A * | 2/1989 | Macfarlane et al. | | 123/403 |
| 4,989,563 A * | 2/1991 | Fukutomi et al. | | 123/327 |
| 5,066,315 A * | 11/1991 | Haberl et al. | | 95/271 |
| 5,526,266 A | 6/1996 | Rutan et al. | | |
| 5,778,674 A * | 7/1998 | Kimura | | 60/600 |
| 5,900,595 A * | 5/1999 | Akima et al. | | 181/229 |
| 6,067,800 A | 5/2000 | Kolmanovsky et al. | | |
| 6,422,201 B1 * | 7/2002 | Yamada et al. | | 123/336 |

(Continued)

FOREIGN PATENT DOCUMENTS

EP  1918009 A  *  7/2008

(Continued)

OTHER PUBLICATIONS

European Search Report received Jun. 7, 2010 (4 pages).

*Primary Examiner* — Stephen K Cronin
*Assistant Examiner* — Raza Najmuddin

(57) ABSTRACT

An engine combustion air pre-cleaner includes a body shaped for effecting cyclonic air flow between an inlet and an outlet of the body. Located along a longitudinal axis of the body is a conical throttling member which is coupled to a control device which operates in response to increasing engine load, as represented by increasing boost pressure, torque and/or speed, to shift the throttling member so as to cause an increasing air flow with increasing engine load.

6 Claims, 1 Drawing Sheet

U.S. PATENT DOCUMENTS

| | | | |
|---|---|---|---|
| 6,431,143 B1 | 8/2002 | Pratt et al. | |
| 6,599,093 B2 * | 7/2003 | Totsuka | 417/28 |
| 6,644,897 B2 | 11/2003 | Martinez et al. | |
| 6,668,782 B2 * | 12/2003 | Bochum et al. | 123/184.55 |
| 6,921,424 B2 | 7/2005 | Bugli et al. | |
| 6,941,926 B2 * | 9/2005 | Fagala | 123/336 |
| 6,990,949 B2 | 1/2006 | Kataoka et al. | |
| 7,412,961 B2 * | 8/2008 | Doring | 123/198 E |
| 7,682,413 B2 * | 3/2010 | Sheidler | 55/345 |
| 2009/0025672 A1 * | 1/2009 | Akimoto et al. | 123/184.53 |
| 2010/0114461 A1 * | 5/2010 | Gibson | 701/112 |

FOREIGN PATENT DOCUMENTS

| | | | |
|---|---|---|---|
| FR | 1134443 A | | 4/1957 |
| FR | 2511268 A | * | 2/1983 |
| SU | 612060 A | * | 5/1978 |
| WO | 2006/045488 A1 | | 5/2006 |

* cited by examiner

ENGINE COMBUSTION AIR CYCLONIC PRE-CLEANER EMBODYING THROTTLING MEMBER ADJUSTED IN ACCORDANCE WITH ENGINE LOAD

FIELD OF THE INVENTION

The present invention relates to air pre-cleaners for engines used in vehicles that work in very dusty environments, and more specifically relates to such pre-cleaners as can be adjusted for maximizing the horsepower output of the engine.

BACKGROUND OF THE INVENTION

Combines and other vehicles often operate in environments where the air is heavy laden with dust from the earth and plant residues which tend to cause rapid contaminant accumulation in the air filter media unless an air pre-cleaner is used to remove the bulk of the airborne particulate matter. Traditional engine combustion air pre-cleaners use a variety of methods to generate a cyclonic action which tends to separate the particulate matter from the air by way of differences in inertial loadings along curved trajectories. Since the particulate matter has a higher density than does the air, the particulate matter accumulates further outboard of the centrifugal axis of the body of the pre-cleaner device through which air is being circulated along a curved path going about the axis. While these devices effectively remove the particulates from the combustion air, they suffer from the drawback that a large pressure drop occurs between the air inlet and outlet which inhibits air flow into the engine, robbing it of power.

One known combustion air pre-cleaner developed for addressing the problem of engine power loss due to the engine having to overcome a large pressure drop in the combustion air as it passes through the body of the pre-cleaner device is disclosed in U.S. Pat. No. 6,921,424, wherein a cylindrical tubular body of a pre-cleaner device is constructed with an air inlet and an air outlet disposed along the longitudinal axis of the body, with a substantially egg-shaped body being disposed axially within the body just upstream of a conical end of an outlet tube mounted for being adjusted axially within the body so as to vary the restriction defined between the downstream end of the egg-shaped body and the end of the outlet tube, the amount of restriction being determined in accordance with the combustion air requirement of the particular engine being used so as to minimize the pressure drop across the pre-cleaner. The problem with this patented pre-cleaner is that it is designed for an automobile engine and does not take into account the large range of load conditions imposed on an engine used in an off-road applications, such as that imposed on a combine harvester engine during a typical harvesting operation, for example.

The problem that presents itself then is that of providing a cyclonic type pre-cleaner which is operable for supplying pre-cleaned combustion air to an engine while not robbing power from the engine throughout normal operating conditions where the load imposed on the engine varies considerably.

SUMMARY OF THE INVENTION

According to the present invention, there is provided an improved combustion air pre-cleaner for the engine of a vehicle operated in dusty environments where there is a wide variance in engine load requirements.

An object of the invention is to provide a cyclonic type combustion air pre-cleaner which includes a flow control element which is controllable to vary the cross sectional area of a passage through which the cleaned air flows during the course of operation so that during low engine loading conditions low air flow and a stronger cyclonic action is achieved, and during high engine loading higher air flow is allowed with little or no increase in pressure drop as is normally experienced across a pre-cleaner when a high engine load occurs. This object is accomplished by including a throttling member located centrally within a body of the pre-cleaner and being axially adjustable for modifying the air flow through the body for optimizing the degree of cyclonic action over a large engine load range while ensuring that the engine receives sufficient air for maintaining engine power.

DESCRIPTION OF THE PREFERRED EMBODIMENT

Figure 1:
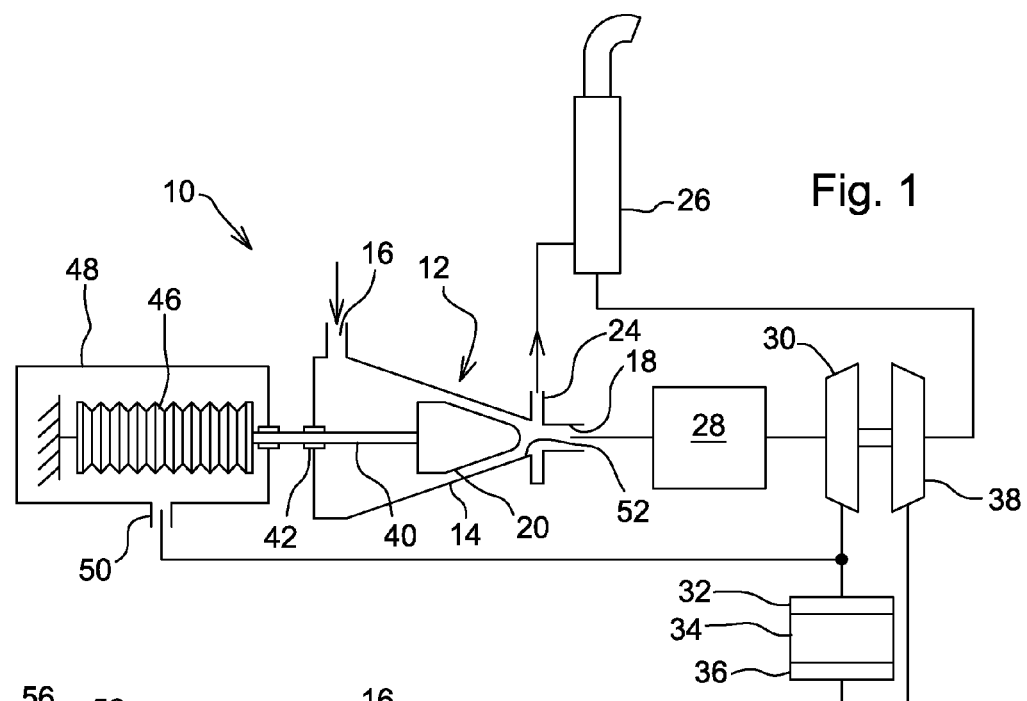
FIG. 1 is a schematic view of an engine combustion air supply system-embodying a pre-cleaner constructed in accordance with a first embodiment of the invention wherein an aneroid is used for effecting air flow control.

Referring now to FIG. 1, there is shown an engine combustion air supply system 10 including a pre-cleaner 12 of a cyclonic type which operates to separate relatively heavy contaminant particles from the air by causing the air to flow in a path which results in the air being subject to centrifugal force causing the contaminants to move outwardly in the air stream with relatively clean air being left in an inner part of the stream. While the pre-cleaner 12 could be of any known shape for effecting cyclonic separation it is here shown as including a substantially conical body 14 having an air inlet 16 disposed tangentially at its large end and a clean air outlet 18 extending axially from its small end. Located along the axis of the conical body 14 is a throttling element 20 having a conically shaped downstream end region that parallels a downstream conical wall region of the body 14 when the throttling cone is in an intermediate throttling position, as shown. In order to enhance the tendency for air to flow against the inner surface of the body 14, the exterior of the throttling element 20 may be provided with fins or the like (not shown). Since the air flowing through the body 14 is subject to a centrifugal force, relatively heavy contaminant particles will be forced outwardly in the air stream flowing through the body 14 and are drawn through a contaminant outlet 24 projecting radially from the small end of the housing 14, by an aspirator (not shown) incorporated in an engine exhaust muffler 26 that is coupled to the outlet 24.

The clean air outlet 18 is coupled to an inlet of an air filter 28 having its outlet coupled to a turbocharger compressor 30 which delivers compressed air to an intake manifold 32 of an engine 34 having an outlet manifold 36 coupled for driving a turbine 38 coupled for driving the compressor 30. Exhaust gasses pass through the turbine 38, which has an outlet coupled to the exhaust muffler 26.

To this point what has been described is known in the prior art.

The present invention resides in an air flow control device which utilizes the throttling element 20 as the controlling element. Specifically, a control rod 40 is received within a circular guide 42 provided in a hole located in an upstream end wall 44 of, and along the longitudinal axis of, the pre-cleaner body 14. One end of the control rod 40 is fixed to an upstream end of the throttling element 20, while the other end of the rod is fixed to one end of a cylindrical, hermetically sealed, expansible and retractable aneroid body 46 having its other end anchored within a housing 48 enclosing the body 46. The housing 48 is provided with an opening 50 coupled to an outlet of the compressor 30 so that the aneroid body 46 is subject to the outlet air pressure, or intake manifold pressure. When the engine 34 is idling, the pressure of the air flowing from the turbocharger compressor 30 and the engine intake manifold 32 is relatively low resulting in the throttling element 20 being held in a preselected, rightwardly shifted position relative to an outlet end region 52 of the pre-cleaner body 14 so as to restrict the flow of air from the body. As the engine 34 operates faster and/or under load, the pressure within the intake manifold 32 increases resulting in the pressure within the housing 48 for the aneroid body 46 increases causing the body 46 to contract so as to open up the air flow area about the throttling element 20 so as to increase the flow of air to the engine 34 while maintaining a desired pressure drop across the pre-cleaner body 14. Of course, operation of the engine 34 results in exhaust gasses flowing out of the exhaust manifold and through the turbine 38 which drives the compressor 30, with the exhaust air exiting the turbine 38 and flowing through the exhaust muffler 26, with an aspirator section (not shown) within the muffler 26 acting to suck separated contaminant particles away from the pre-cleaner body 14 by way of the outlet 24.

Figure 2:
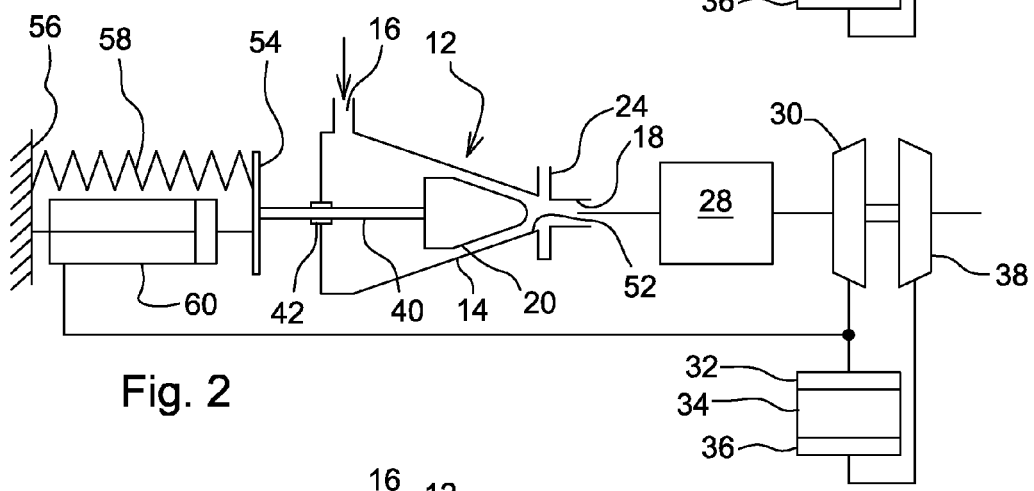
FIG. 2 is a schematic representation of a second embodiment of the air supply system wherein an air cylinder is used for effecting air flow control.

Referring now to FIG. 2, the structure there is identical to that shown in FIG. 1, except that instead of the aneroid body a control device mounting plate 54 is fixed to the left-hand end of the control rod 40. Fixed between an anchor member 56 and the plate 54 is a coil compression spring 58 and an air cylinder 60, the spring acting to bias the throttling element 20 to a maximum rightwardly shifted metering position for establishing a preselected minimum flow path area between the element 20 and the body 14 for air flow from the pre-cleaner, and the air cylinder 60 being coupled for receiving pressurized air from the engine intake manifold 32, which is the boost pressure generated by the turbocharger compressor 30. This pressure acts within the air cylinder 60 so as to overcome the spring 58, and cause the plate 54 to move to the left, thereby causing an increase in the air flow area about the throttling cone and the outlet end region of the housing 14 of the air-cleaner 12.

Figure 3:
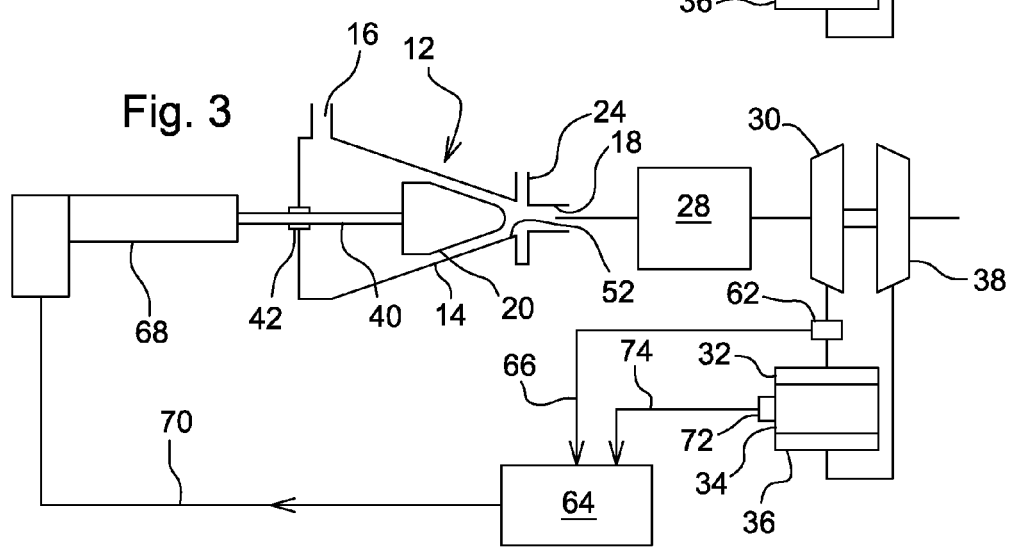
FIG. 3 is a schematic representation of a third embodiment of the air supply system wherein a linear stepper motor is used for effecting air flow control

Referring now to FIG. 3, the structure there differs from that disclosed in FIG. 1, in that instead of the pressurized air from the engine intake manifold 32 being coupled to a control device for the throttling element 20, a pressure sensor 62 is provided for sensing the boost pressure established in the engine intake manifold 32 by the turbocharger compressor 30, with the sensor 62 generating an electrical signal representing the sensed boost pressure. This electrical signal is connected to an electrical control unit 64 over an electrical lead 66, the control unit acting to send out an appropriate control signal to a stepper motor of an electrical linear actuator 68 having an output shaft connected to the control rod 40. Thus, the actuator 68 occupies a preselected extended condition for establishing a small air flow area between the throttling element 20 and the pre-cleaner housing 14 when the engine 34 is operating at a low speed and/or low load. As the engine speed and/or load increases, the boost pressure increases with the result that the electrical signal generated by the sensor 62 increases with the electric control unit 64 sending an increased signal to the stepper motor of the actuator 68 over a lead 70 so as to cause the output shaft of the actuator 68 to contract and move the throttling element 20 to the left an appropriate amount for effecting a desired increase in the air flow area between the throttling element 20 and pre-cleaner body 14.

An engine operation sensor 72 is coupled between the engine 34 and electronic control unit by a lead 74. The sensor 72 could be a speed or load sensor, for example, which generates a representative electrical signal for processing by the control unit 64, which may be programmed with a lookup table containing engine performance data which can be used together with the manifold pressure to arrive at an appropriate control signal for the electrical stepper motor of the linear actuator 68.

Having described the various embodiments, it will become apparent that various other modifications can be made without departing from the scope of the invention as defined in the accompanying claims.

The invention claimed is:

1. In a turbocharged engine combustion air control system including an engine having an air intake manifold pre-cleaner including a body shaped for causing a cyclonic air flow between an inlet and a clean air outlet of said body and having a longitudinal axis, an air filter being coupled between said clean air outlet and a compressor, with said compressor being coupled to said intake manifold and operable for effecting a boost pressure in said intake manifold, the improvement comprising: a throttling member being located within, and mounted for movement along said longitudinal axis of, said body of said pre-cleaner for selective movement relative to said body for adjusting an amount of flow area between said throttle and said body; and a pressure-responsive control arrangement including a control device coupled to said throttling member and operable for increasing said flow area in response to increasing boost pressure.

2. The air control system, as defined in claim 1, wherein said control arrangement includes an extensible and retractable aneroid body located within a housing and having a first end coupled to said throttling member and an anchored opposite second end; and an air conveying line being coupled between said housing and said air intake manifold, whereby said aneroid body increasingly contracts in response to increasing boost pressure to thereby cause said throttling member to move to increase air flow through said pre-cleaner body.

3. The air control system, as defined in claim 1, wherein said control arrangement includes an extensible and retractable air cylinder mounted in parallel with a spring for resisting retraction of said air cylinder, with said spring and air cylinder being connected to said throttling member.

4. The air control system, as defined in claim 1, wherein said control arrangement includes an extensible and retractable electric power actuator including a stepper motor; a pressure sensor being coupled to said air intake manifold and being operable for generating an electric input signal representing said boost pressure; an electronic control unit being coupled for receiving said input signal from said pressure sensor and being coupled to said stepper motor for sending a control output signal, directly related to said input signal, to said stepper motor for causing the latter to effect increasing retraction of said power actuator in response to increasing control signals, thereby effecting increasing air flow through said pre-cleaner body.

5. The air control system, as defined in claim 4, and further including at least one engine operation sensor for sensing one of engine speed or engine load and generating a representative second electrical input signal; said engine operation sensor being coupled to said electronic control unit; and said electronic control unit being operable for generating an output signal corresponding to, and dependent on, said first and second input signals.

6. A method of controlling engine combustion air for a turbocharged engine wherein an air supply system includes a pre-cleaner having a body having an air inlet and a clean air outlet and being shaped for creating a cyclonic air flow between said inlet and outlet, including the steps of:
   a. providing an air throttling element for throttling a flow of clean air passing out of said pre-cleaner body, with the throttling element being movable between first and second positions for respectively establishing minimum and maximum areas through which said clean air may flow when exiting said pre-cleaner body; and
   b. automatically controlling said movement of said throttling element in accordance with a load imposed on said engine, with said area through which said clean air may flow increasing with increasing load on said engine.

* * * * *